Oct. 6, 1942.   L. L. COLLINS   2,297,943
AIR CUSHIONED VALVE FOR COMPRESSORS
Filed March 28, 1941   3 Sheets-Sheet 1

INVENTOR
LESTER L. COLLINS.
BY
Raymond G. Mullee
ATTORNEY

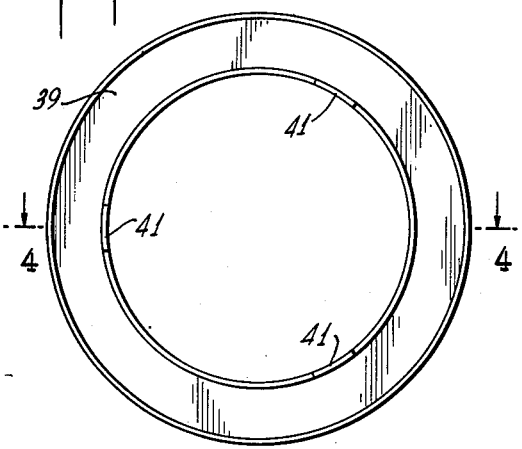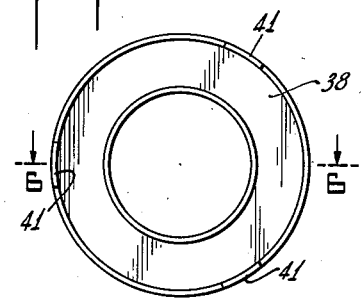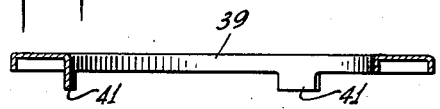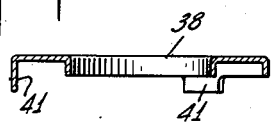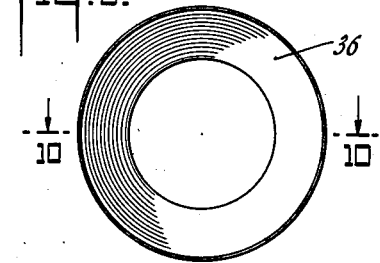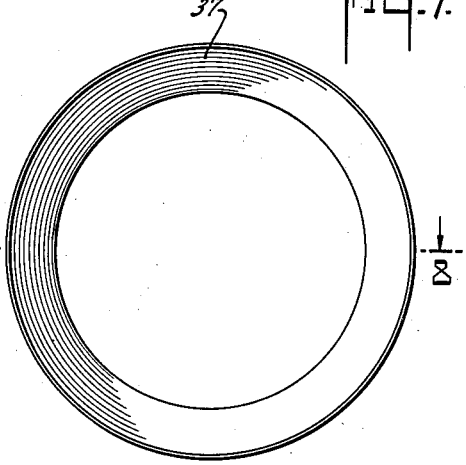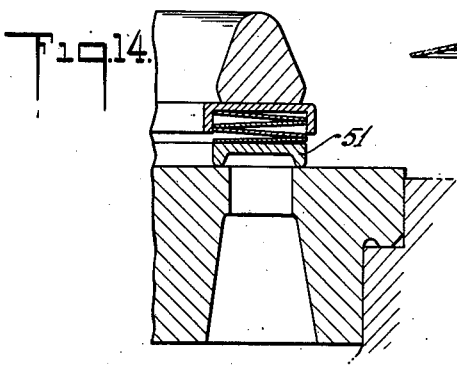

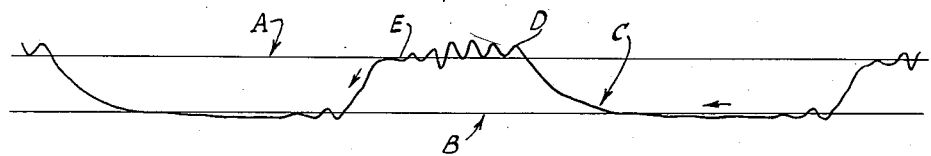
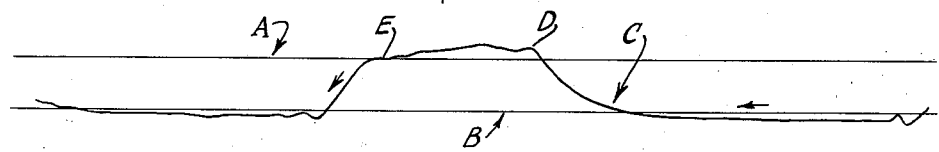
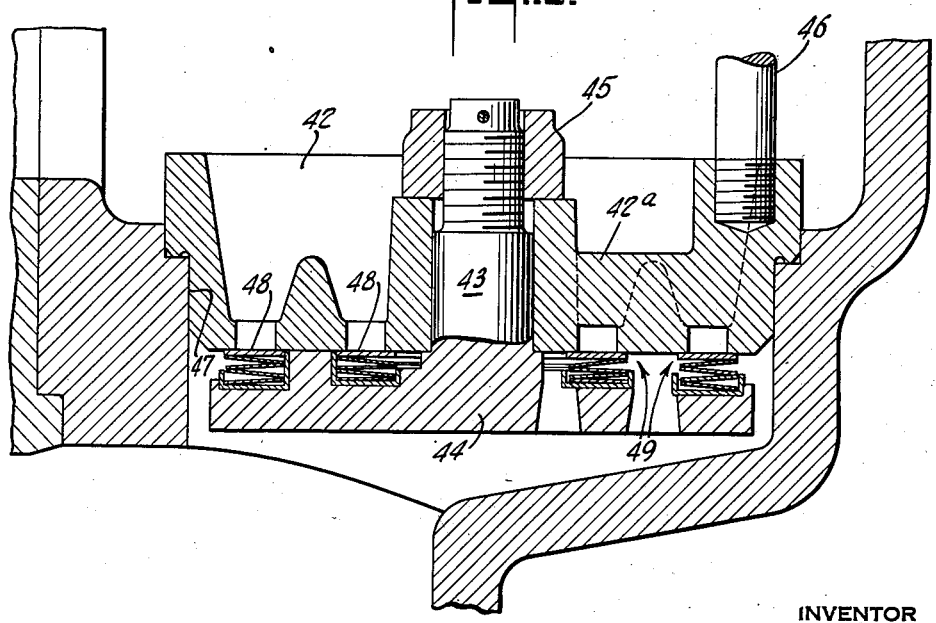

Patented Oct. 6, 1942

2,297,943

UNITED STATES PATENT OFFICE 2,297,943

AIR-CUSHIONED VALVE FOR COMPRESSORS

Lester L. Collins, Franklin, Pa., assignor to Chicago Pneumatic Tool Company, New York, N. Y., a corporation of New Jersey Application March 28, 1941, Serial No. 385,631

6 Claims. (Cl. 277—60)

This invention relates to valve assemblies and has particular reference to valve assemblies embodying reciprocable plate valves which move with a quick action to open and closed positions in response to pressure variations of a determined degree on the opposite sides thereof.

Valve assemblies of this kind are used in air compressors and like machines to control the flow of air to and from the compression chamber. This function is performed by the conventional plate valve assembly in a manner producing certain disadvantageous results which it is the object of this invention to avoid. In most cases in the prior art movement of the plate valves from closed position is opened by relatively stiff springs which absorb the kinetic energy of the valves as they move to open position. When the valves are brought to a stop in fully opened position the springs expend the energy so absorbed in returning the valves toward closed position. The return movement of the valves is stopped either by contact with the valve seat or by an increase in the pressure differential on opposite sides of the assembly, whereupon the pressure below the valves builds up sufficiently again to force the valves toward open position. In discharging compressed air from the compressor cylinder this cycle is repeated numerous times in a single discharge period with the result that the air emerges from the cylinder in a series of short quick blasts. When the air velocities are low due to excessive valve area or a low operating speed of the compressor the deflection of the valve springs is comparatively small and the valves vibrate with high frequency close to the valve seat. The consequent rapidity with which the puffs of air emerge from the ported area of the valve seat creates an air disturbance which is within the range of audibility and is generally heard as a groaning noise. As the speed of the compressor increases and the air velocities rise, the deflection of the valve springs is greater and the frequency of movement of the valves therefore lower. At very high air velocities the only sounds heard are the separate impacts of the valves against the seat and the valve guide or keeper. The point at which the groaning noise will cease is determined by the stiffness of the valve springs. To lower the vibration frequency of the valves at low air velocities it is necessary to use valve springs sufficiently weak to permit the valves a relatively long travel from the valve seat when opening. This practice has heretofore been considered inadvisable, however, since it has been found that valves opposed only by relatively weak springs will strike the keeper while still moving at high speed and rebound toward seated position. Such a mode of operation is evidently undesirable, and moreover creates an air disturbance similar to that set up in an assembly using stiff valve springs.

One object of this invention is to reduce valve noise in an air compressor or like machine.

Another object is to obtain the advantages resulting from the use of weak valve springs without incurring the undesirable results previously considered necessary adjuncts to such use.

It is proposed to accomplish these objects by supplementing the pressure of the valve springs with an air cushioning means designed to prevent rebounding of the valves from their keeper. Such an air cushion to be effective must not have too much air to compress back of the valve or the resistant power of the cushion will be slow to increase and air not expelled from the cushion may contain enough energy to return the valve prematurely to closed position. An ideal air cushion would be one in which all the air trapped back of the valve is forced out an orifice and its energy all expended just as the valve reaches its point of maximum opening and has been brought to zero velocity. These facts have been borne in mind in designing the device of the present invention and a valve structure thereby produced in which a novel valve assembly and combination guide and buffer plate cooperate in obtaining full and efficient control of the plate valves. The spring assembly is composed of a plurality of bowed springs stacked loosely one upon another, with each spring arranged in inverse relation to the spring or springs on the opposite sides thereof and expansible outward when compressed. The spring assembly is interposed between the buffer plate and a valve and is loosely fitted within a cushioning chamber formed in the buffer plate. When compressed the spring assembly is adapted to fill the cushioning chamber and thereby expel the air therefrom while the expansive action of the individual springs reduces the size of the escape area between the wall of the chamber and the edges of the springs.

Additional objects of the invention are to produce a valve assembly having the improved construction noted above and to obtain generally a more efficient, smoother acting valve structure than has been disclosed in the prior art. One improved result of a general nature which may be noted is that the less restricted openings of the present valve assembly permit a reduction in the power required to force a given quantity of air past the valves.

Figure 2:
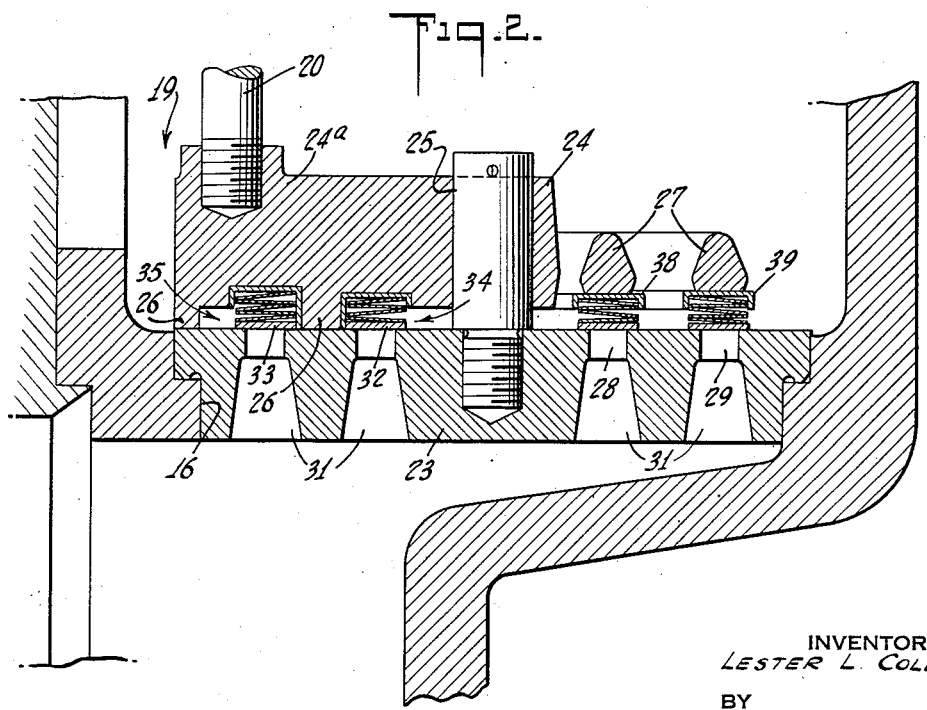
Fig. 2 is a view, in longitudinal section, of the discharge valve assembly of Fig. 1 and a fragmentary portion of the compressor cylinder, Fig. 2 being enlarged with respect to Fig. 1.

Figs. 3-6 are detail views of the buffer plates of the assembly shown in Fig. 2; Figs. 3 and 5 being bottom plan views of the respective outer and inner plates of the assembly, while Figs. 4 and 6 are cross sectional views taken along the lines 4—4 and 6—6 of Figs. 3 and 5 respectively;

Figs. 7-10 are detail views of single elements of the two spring assemblies shown in Fig. 2; Figs. 7 and 9 being bottom plan views of individual springs in the respective outer and inner assemblies, while Figs. 8 and 10 are cross sectional views taken along the lines 8—8 and 10—10 of Figs. 7 and 9 respectively;

Fig. 11 is a diagram illustrating the pressure changes occurring adjacent a valve assembly of the prior art during successive intake and discharge periods of a compressor;

Fig. 12 is a diagram like Fig. 11, showing similar pressure changes in a compressor equipped with the valve mechanism of this invention;

Fig. 13 is a view similar to Fig. 2, showing the invention embodied in an inlet valve assembly; and Fig. 14 is a fragmentary view, in longitudinal section, of a valve assembly constructed in accordance with the invention but using a plate valve of modified form.

Figure 1:
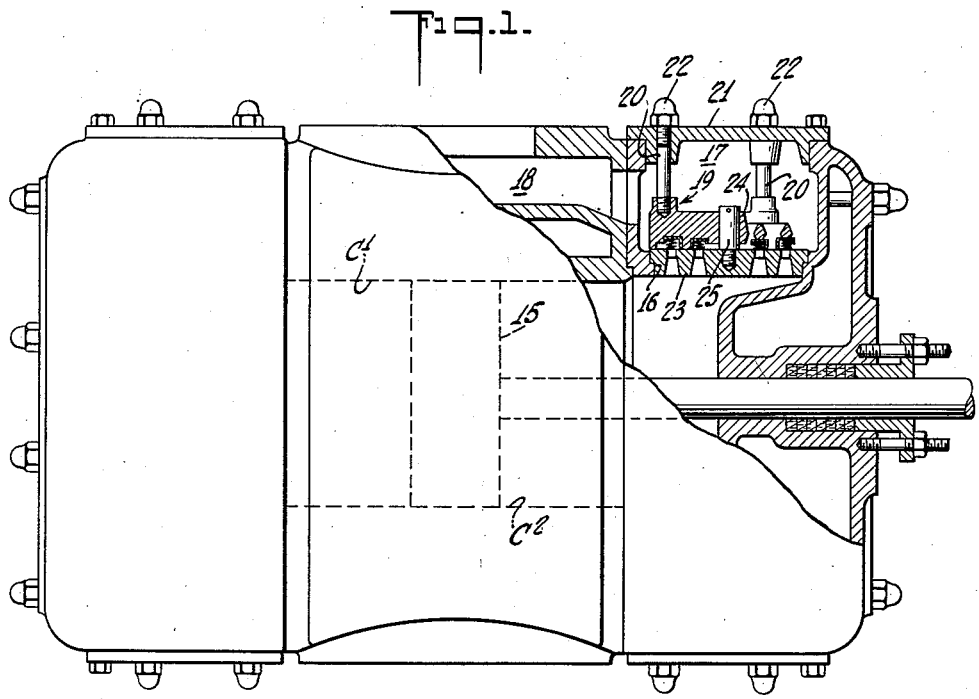
Fig. 1 is a view of a compressor cylinder embodying the valve mechanism of the invention, part of the cylinder being broken away to show a discharge valve assembly in longitudinal section.

The compressor cylinder of Fig. 1 is of the double acting type in which an independent compression chamber is formed on each side of a reciprocable piston 15. The flow of air to and from the compression chambers, indicated at C—1 and C—2, is controlled by respective sets of pressure responsive inlet and discharge valves located adjacent the opposite ends of the cylinder within the periphery thereof. A portion of the cylinder is broken away to show one of the control valves and the manner in which it is mounted within the cylinder. This valve, arranged to function as a discharge valve, is constructed in accordance with the invention and is positioned within an opening 16 connecting the compression chamber C—2 to a valve chamber 17 communicating with a discharge passage 18. Indicated generally at 19, the valve rests upon a ledge in the opening 16 and is further supported by three rods 20 projecting from a closure plate 21 and secured against outward movement by the usual set screws 22. The closure plate 21 is removable to permit easy access to the valve chamber 17.

Referring to Fig. 2, the valve assembly 19 is seen to comprise a circular valve seat 23 and a circular valve keeper 24 the adjacent surfaces of which are held in contact by a connecting bolt 25. The bolt 25 extends through the mid-portion of the keeper 24 and has its inner end secured within a centrally positioned recess in the valve seat 23. The outer periphery of the seat 23 is cut away to form a shouldered portion engageable with the ledge in opening 16, while the keeper 24 has three radial arms 24a each adapted to receive a respective one of the holding rods 20. The arms 24a of the valve keeper are spaced equidistant from each other and are provided with inwardly extending fingers 26 which engage the valve seat 23 and hold the main body of the keeper slightly spaced therefrom. The arms 24a further serve to connect a pair of annular ribs 27. Ported areas are formed between the ribs 27, and air may pass freely through the valve keeper and between it and the valve seat.

The valve seat 23 is formed with inner and outer annular ported areas 28 and 29 intersected by radially extending ribs 31 lying inside the outer surface of the seat. The ported areas 28 and 29 extend longitudinally through the valve seat thereby establishing communication between the compression chamber C—2 and the valve chamber 17. Upon emerging from the ported areas 28 and 29 the air discharged from the compression chamber C—2 passes through and around the valve keeper 24 to the discharge passage 18. The flow of air through the valve seat 23 is controlled by conventional plate valves in the form of rings 32 and 33 which rest on the outer surface of the seat and are adapted to cover the respective ports 28 and 29. The valve rings are movable axially to open and closed positions with respect to the ported areas of the valve seat and are pressed to closed position by individual spring assemblies 34 and 35 interposed between a respective valve and the keeper 24. When, during the compression stroke of the piston 15 the pressure in chamber C—2 mounts to a height sufficient to overcome the pressure of the sets of springs 34 and 35 the valve rings 32 and 33 are lifted from the seat 23, whereupon the compressed air flows through the valve assembly to the discharge passages. As the piston 15 reaches the end of the compression stroke, the pressure beneath the valve rings is reduced below that necessary to deflect the springs 34 and 35 and the rings are returned to seated or closed position.

The spring assemblies 34 and 35 are composed respectively of a plurality of ring-shaped single springs 36 and 37 (see also Figs. 7-10) stacked one upon another. The springs 36 and the springs 37 differ in diameter in order that they may conform in size to their respective inner and outer valve rings 32 and 33 but are otherwise the same in construction and arrangement. Each spring is made of flat thin metal stock and is bowed in a dish-like contour causing the opposite sides thereof to assume convex and concave shapes. The resulting conical form of the spring enables it to resist with a yielding pressure any force tending to flatten or straighten it. In assembling each of the sets of springs 34 and 35 one spring is placed loosely on top of another until a stack of the desired number is obtained. Further, the individual springs are disposed in inverse relation to each other. Thus, if, as in assembly 35, the spring nearest the valve ring has its convex surface facing outward, the next adjacent spring is arranged with its convex surface facing inward in contact with the convex surface of the first spring. Each spring is thereby permitted a slight movement relative to the other springs and the total of these movements represents the limit of travel permitted a valve ring from closed position. If desired a flat disc may be placed between each pair of the springs to eliminate the possibility of a snap action thereof.

The spring assemblies 34 and 35 are mounted in respective combination guide and buffer plates 38 and 39 (see also Figs. 3-6) which abut against the annular ribs 27 of valve keeper 24 and fit within complementary recesses in the radial arms 24a of the keeper. The guide and buffer plates 38 and 39 are channel-shaped circular elements overlying their associated valve rings 32 and 33 and are formed with projecting guide lugs or tongues 41 engaging the valve seat adjacent one edge of a valve ring. The tongues 41 of plate 38 are formed on the outer edge of the plate and guide the valve 32 by contact with the outer edge thereof, while the guide tongues of plate 39 are on the inner edge of the plate and extend within the inner edge of valve ring 33. As a spring assembly is compressed the air between the springs and within the channeled portion of the associated buffer plate is displaced. Thus, in addition to acting as guides for the valve rings 32 and 33 and as mountings for the spring assemblies 34 and 35, the buffer plates provide, by reason of their channeled construction, air cushioning chambers which supplement the springs in resisting outward movement of the valves. The displacement of the air from the cushioning chamber is a relatively slow process effecting the absorption of a substantial part of the kinetic energy of the valve ring. By reason of the shape of their individual elements the present spring assemblies are well adapted to this method of cushioning the valve rings since, as the springs are compressed, the clearance between their edges and the wall of the cushioning chamber decreases due to an outward expansion of the springs. Because the springs keep their round shape, this clearance can be kept at a minimum and the cushioning action thereby improved.

Still another feature of importance concerning the combination guide and buffer plates 38 and 39 is that they are easily replaceable elements which may be inexpensively stamped out as independent parts. Also, the use of these elements renders unnecessary hardening of the entire keeper 24 since the keeper is not exposed to the wear of moving parts. However, if it should be found desirable, the buffer plates may be dispensed with as individual parts by forming the guide lugs and cushioning chambers in the surface of the keeper itself.

In cushioning the valve rings in the manner described the motion of the valves toward open position is slowed down and their return to closed position is retarded. The spring assemblies 34 and 35 are weaker than the conventional volute or coil springs and so permit the valve rings a greater lift from closed position than is possible when they are opposed by stiffer springs. The velocity of the valves as they move from closed position is steadily decreased as the single springs are successively compressed and as the air is forced out of the cushioning chamber. The valves attain a maximum opening as they are brought to a zero velocity and at this point all or most of the air trapped in back of the valves has been displaced. Thus, the air pressures urging the valves toward closed position are without substantial effect so that the pressure of the air acting on the underside of the valves may drop slightly below the original opening pressure without causing the valves to return toward the valve seat. The spring assemblies, being weak, do not store up energy in amounts sufficient to cause the valves to respond instantly to fluctuations in the discharge pressure and as a result, the valves remain in open position until such pressure is appreciably lowered.

In the present valve assembly, therefore, the valve rings 32 and 33 reach a maximum opening and zero velocity at approximately the same time and so do not rebound from the valve keeper when opening. In addition the tendency of the valves to reciprocate during the discharge period in response to slight variations in the discharge pressure is greatly reduced and the noise which is a necessary accompaniment to such operation thereby greatly lessened. In order that a better understanding of the effect obtained by the valve assembly of the invention may be had, there is included in the drawings two diagrams, Figs. 11 and 12, the first of which shows the pressure changes caused by reciprocation of the valve rings of a conventional valve assembly during a discharge period, and the second of which depicts similar presure changes in a valve assembly embodying this invention. In each view, Figs. 11 and 12, a pair of spaced horizontal lines A and B represent respectively the normal pressures at which the discharge and inlet valves of a compressor open. The line C indicates the pressure changes of the air beneath the valve rings 32 and 33 during successive intake and compression strokes of the piston 15. The line C should be read from right to left, as indicated by the directional arrows, to follow the pressure changes in their true order of progression. It will be noted that during the compression stroke the air pressure rises gradually until it slightly exceeds the normal discharge pressure. At this point, indicated at D, the discharge valves are forced open and air passes out the valve assembly. In a valve assembly employing the usual volute or coil springs the valve rings are returned toward closed position after the first burst of pressure through the assembly with the result, as shown in Fig. 11, that the pressure below the valve rings after first dropping slightly, again mounts above the normal discharge pressure and again forces the valves to fully opened position. This reciprocation of the valve rings and accompanying pressure fluctuations continues throughout the discharge period. This condition is illustrated in Fig. 11 by the irregularity of line C between point D and a point E marking the end of the discharge period. Since, in a valve assembly constructed in accordance with the present invention the return of the valve rings from fully opened position is retarded, the discharge line of Fig. 12 is comparatively straight or regular, indicating that pressure changes resulting from reciprocation of the valve rings are slight or nonexistent. Thus, the discharge of air through a valve assembly of the present class is a smooth uninterrupted operation as contrasted with the intermittent bursts with which the air is forced past the fluttering discharge valves of the prior art.

In Fig. 13 the invention is disclosed as embodied in an inlet valve assembly. In all essential respects of construction and mode of operation this assembly does not differ from the discharge valve assembly of Fig. 2. The positions of the valve keeper and valve seat are reversed, however, inasmuch as the air in this case flows from outside the assembly into the compressor cylinder and not in the opposite direction as in a discharge operation. Accordingly, the inlet assembly comprises a ported valve seat 42 having radially extending ribs 42a and a central bore through which an upright stem 43 of a keeper 44 extends. The stem 43 projects through the valve seat 42 and is threaded at its outer end to receive a nut 45 and thereby lock the elements 42 and 44 in assembled position.

The valve seat 42 is adapted for cooperation with holding rods 46 corresponding to the rods 20 of Fig. 2, and is positioned within a frame opening 47 in such a manner as to place the ported areas of the seat in communication with the interior of the cylinder. The ported areas of the seat 42 are controlled by ring valves 48 and associated spring assemblies 49 similar in all respects to the corresponding elements controlling the ported areas of the discharge valve.

In Fig. 14 a slightly modified form of the invention is shown in which ring valves having a channel shape are used instead of the flat discs shown in Figs. 2 and 13. This valve, indicated at 51, covers the ported area of the valve seat with its open surface facing downward and so makes contact with the seat only along the two lines defining the inturned edges of the valve. Such a construction makes for additional quietness of operation since the area of contact between the valve and valve seat is reduced and the impact of a closing valve therefore produces a less noticeable sound.

What is claimed is:

1. A valve assembly, comprising a ported valve seat, a valve movable to open and closed positions relative to a ported area of said valve seat, a spring assembly composed of a plurality of annular bowed springs for urging said valve toward closed position, and a combination guide and buffer plate for said valve provided with a cushioning chamber serving as a mounting for said spring assembly and with projecting tongues engaging said valve seat at points adjacent one edge of said valve.

2. A valve assembly, comprising a ported valve seat, a valve movable to open and closed positions relative to a ported area of said valve seat, a spring assembly for urging said valve toward closed position, said spring assembly comprising a plurality of bowed springs stacked one upon another and having an expansive action in one direction when compressed, and a mounting for said spring assembly comprising a cushioning chamber of a size to receive said valve and to be filled by the expansive action of said springs.

3. A valve assembly, comprising a valve seat having an annular ported area, a ring-shaped valve adapted to cover the ported area of said valve seat and movable axially to a lifted or open position relatively thereto, a spring assembly urging said valve toward seated or closed position and including a plurality of ring-shaped bowed springs stacked one upon another and having a radially expansive action when compressed, and a mounting for said spring assembly forming a cushioning chamber of a size to receive said valve and to be filled by the expansive action of said springs.

4. A valve assembly, comprising a valve seat having an annular ported area, a ring-shaped valve adapted to cover the ported area of said valve seat and movable axially to a lifted or open position relatively thereto, a spring assembly urging said valve toward seated or closed position and including a plurality of ring-shaped bowed springs stacked one upon another and having a radially expansive action when compressed, a mounting for said spring assembly forming a cushioning chamber of a size to receive said valve and to be filled by the expansive action of said springs, means integral with said spring mounting for guiding said valve, and means for holding said valve seat and said spring mounting in assembled position with the guiding means of said mounting engaging said valve seat at points adjacent one edge of said valve.

5. A valve assembly, comprising a ported valve seat, a reciprocable plate type valve movable to open and closed positions relatively to a ported area of said valve seat, a buffer plate longitudinally spaced from said valve and having inturned edges forming a channeled portion facing toward said valve, a spring assembly interposed between said buffer plate and said valve for urging said valve toward closed position, said assembly comprising a plurality of bowed springs stacked one upon another and adapted when compressed to fill the channeled portion of said buffer plate and thereby displace the air therefrom.

6. A valve assembly, comprising a ported valve seat, a reciprocable plate type valve movable to open and closed positions relatively to a ported area of said valve seat, a buffer plate longitudinally spaced from said valve and having an inturned edge forming a flange facing toward said valve, and a spring assembly interposed between said buffer plate and said valve for urging said valve toward closed position, said assembly comprising a plurality of bowed springs stacked one upon another and adapted when compressed to displace the air between said springs and to expand radially to restrict the escape of the displaced air between the inturned flange of said buffer plate and the adjacent edges of said springs.

LESTER L. COLLINS.